United States Patent [19]
Cassarly et al.

[11] Patent Number: 5,826,963
[45] Date of Patent: Oct. 27, 1998

[54] LOW ANGLE, DUAL PORT LIGHT COUPLING ARRANGEMENT

[75] Inventors: William J. Cassarly; John M. Davenport, both of Lyndhurst; Richard L. Hansler, Pepper Pike, all of Ohio

[73] Assignee: General Electric Company, Schenectady, N.Y.

[21] Appl. No.: 607,529

[22] Filed: Feb. 27, 1996

[51] Int. Cl.$^6$ .................................................. F21V 13/12
[52] U.S. Cl. .......................... 362/32; 362/299; 362/302; 362/346
[58] Field of Search .............................. 362/32, 298, 299, 362/302, 303, 304, 305, 308, 346

[56] References Cited

U.S. PATENT DOCUMENTS

| | | |
|---|---|---|
| 4,241,382 | 12/1980 | Daniel . |
| 4,460,939 | 7/1984 | Murakami et al. . |
| 4,950,059 | 8/1990 | Roberts . |
| 5,093,763 | 3/1992 | Vanderschuit .............................. 362/32 |
| 5,178,446 | 1/1993 | Gruber et al. . |
| 5,271,077 | 12/1993 | Brockman et al. . |
| 5,321,586 | 6/1994 | Hege et al. . |
| 5,416,669 | 5/1995 | Kato et al. . |
| 5,515,242 | 5/1996 | Li .......................................... 362/298 |

FOREIGN PATENT DOCUMENTS

| | | |
|---|---|---|
| 0 642 047 A1 | 3/1995 | European Pat. Off. . |
| 1383413 | 11/1994 | France . |
| 05088052 | 4/1993 | Japan . |

OTHER PUBLICATIONS (Anonymous), "ASAP: Advanced Systems Analysis Program Advanced Tutorial," Tucson, Arizona: Breault Research Organization, Inc., Dec. 1994, title page, first page, and pp. 1–20 through 1–21.

Davenport et al., "An Improved Optical Coupling Arrangement Between a Lamp and a Light Guide," co–pending application serial No. 08/116,146 (attorney docket no. LD 10304), filed Sep. 2, 1993, cited at p. 1 of the present specification.

Tuma, "Handbook of Physical Calculations," New York: McGraw–Hill Book Company (1976), title and copyright pages and pp. 260 and 261.

Beaven, "Communication and European Search Report (on corresponding foreign application)," European Patent Office (Jun. 6, 1997), three pages.

*Primary Examiner*—Alan Cariaso
*Attorney, Agent, or Firm*—Charles E. Bruzga

[57] ABSTRACT

A compact coupling arrangement between a light source and a plurality of light distribution harnesses includes a plurality of reflector members arranged around the light source with respective focal points of the reflector members positioned substantially coincident with the light source, so as to receive light from the source and reflect the light away from the source. Further included is a plurality of light coupling members, each having an inlet and an outlet surface for receiving light originating from the light source and transmitting light, respectively. A plurality of light distribution harnesses is provided for respectively receiving light from the light coupling members. The light coupling members each comprise a lens having a negative curvature in at least one direction generally transverse to a main light transmission axis therethrough, for receiving light at a first angular distribution and transmitting light at a reduced angular distribution. To facilitate manufacturing, at least one of the light coupling members may comprise an integral portion of one of the reflector members coinciding with the curvature of a proximate reflector member. Further, at least one of the inlet and outlet surfaces of one of the coupling members maybe non-axisymmetrical about the main light transmission axis of its associated coupling member, for improving efficiency of light coupling.

16 Claims, 11 Drawing Sheets

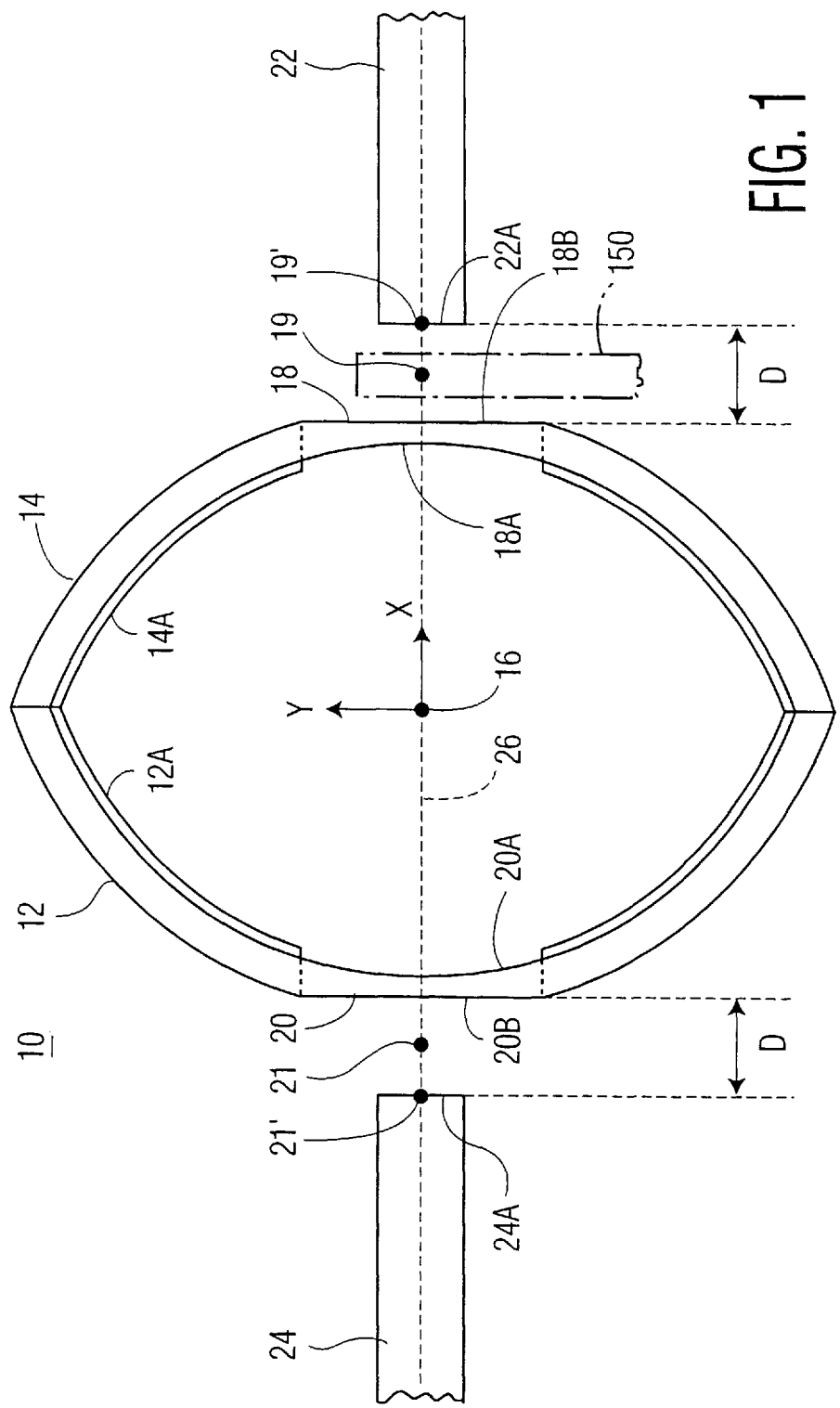

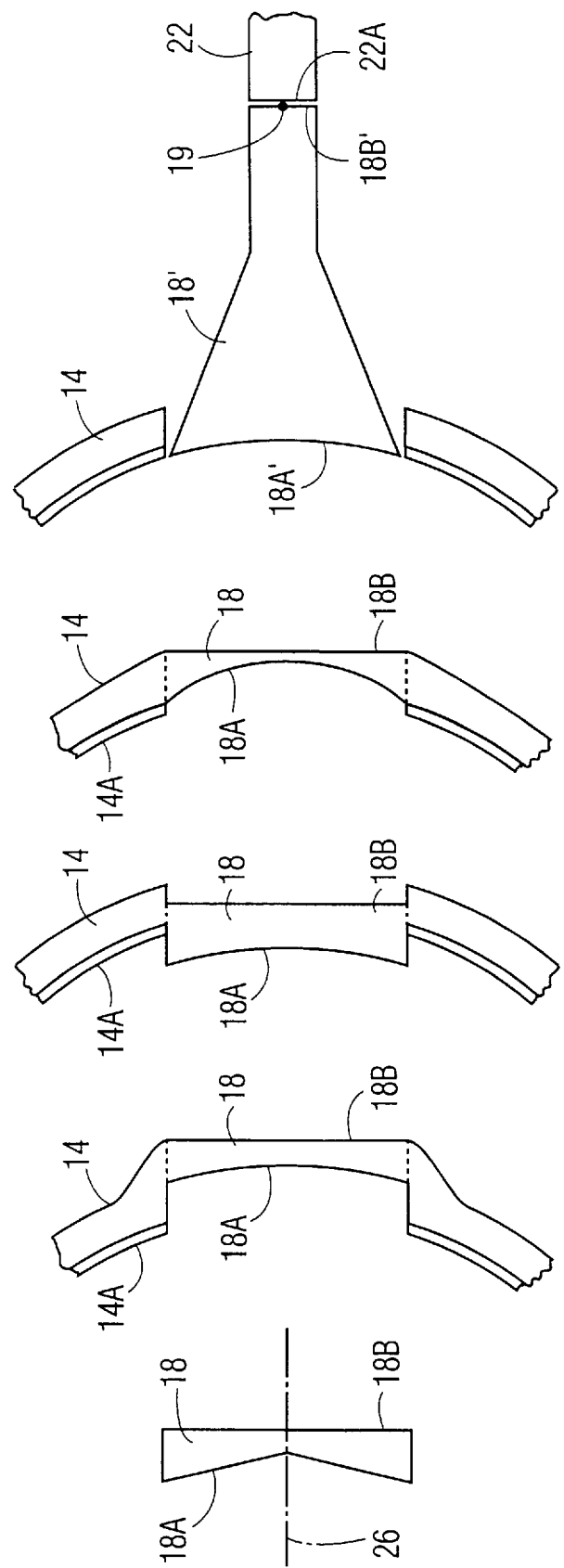

5,826,963

LOW ANGLE, DUAL PORT LIGHT COUPLING ARRANGEMENT

CROSS-REFERENCE TO RELATED APPLICATION

The present application is related to application Ser. No. 08/116,146, now U.S. Pat. No. 5,560,699 entitled "An Improved Optical Coupling Arrangement Between a Lamp and a Light Guide," filed on Sep. 2, 1993, by J. M. Davenport et al., and assigned to the same assignee as the present application.

FIELD OF THE INVENTION

The present invention relates to an arrangement for coupling light between a light source and one or more light distribution harnesses such as light guides. More particularly, the invention relates to the foregoing type of light coupling arrangement wherein light is coupled into the light distribution harness at a low cone angle such as 60 degrees.

BACKGROUND OF THE INVENTION

The present invention relates to arrangements for coupling light at high efficiency between a light source and one or more light distribution harnesses, such as lenses or light guides. For instance, it is desirable to feed light into readily available light guides having numerical apertures of between 0.4 and 0.65. As used herein, a numerical aperture of 0.5 is obtained where 90 percent of the light is contained within a 60-degree cone angle. The above cross-referenced application to J. M. Davenport et al. describes and claims arrangements for efficiently coupling light from a high brightness light source, such as a xenon metal halide high pressure discharge lamp or a halogen lamp, to light guides or other distribution harnesses. In one of the embodiments disclosed, elliptical reflectors focus light through tapered rods into light guides. The tapered rods receive light at one angular distribution at their smaller ends, and transmit light at a lower angular distribution through their larger ends. This achieves a so-called angle-to-area conversion that beneficially enables the use of light guides having numerical apertures in the mentioned range.

It would, however, be desirable to provide further light coupling arrangements that employ different optical elements to achieve a reduction in angular distribution of light transmitted to a light distribution harness. It would also be desirable if embodiments of light coupling arrangements using such different optical elements could be manufactured more easily than embodiments using tapered rods.

SUMMARY OF THE INVENTION

An object of the invention, accordingly, is to provide light coupling arrangements employing optical elements other than tapered rods to achieve a reduction in angular distribution of light transmitted to a light distribution harness.

A further object of the invention is to provide embodiments of light coupling arrangements of the foregoing type that can be manufactured more easily than embodiments using tapered rods.

In accordance with the invention, there is provided a compact coupling arrangement between a light source and a plurality of light distribution harnesses. The arrangement includes a plurality of reflector members arranged around the light source with respective focal points of the reflector members positioned substantially coincident with the light source, so as to receive light from the source and reflect the light away from the source. Further included is a plurality of light coupling members, each having an inlet and an outlet surface for receiving light originating from the light source and transmitting light, respectively. A plurality of light distribution harnesses is provided for respectively receiving light from the light coupling members. The light coupling members each comprise a lens having a negative curvature in at least one direction generally transverse to a main light transmission axis therethrough, for receiving light at a first angular distribution and transmitting light at a reduced angular distribution.

To facilitate manufacturing, at least one of the light coupling members may comprise an integral portion of one of the reflector members coinciding with the curvature of a proximate reflector member. Further, at least one of the inlet and outlet surfaces of one of the coupling members may be non-axisymmetrical about the main light transmission axis of its associated coupling member, for improving efficiency of light coupling.

BRIEF DESCRIPTION OF THE DRAWINGS

The foregoing, and further, objects and advantages of the invention will become apparent from the following description when read in conjunction with the drawings, in which like reference characters designate like or corresponding parts throughout the several views, and in which:

FIG. 1 is a side plan view in section of a light coupling arrangement in accordance with the present invention.

FIG. 2 is detail, side plan view of an alternatively shaped lens that may be used in the light coupling arrangement of FIG. 1.

FIG. 3 is a detail, side plan view of a lens positioned further to the right of the adjacent reflector portion than as shown in FIG. 1.

FIG. 4 is a detail, side plan view of a lens positioned further to the left of the adjacent reflector portion than as shown in FIG. 1.

FIG. 5 is a detail, side plan view of an alternatively shaped lens that may be used in the light coupling arrangement of FIG. 1.

FIG. 6 is a detail, side plan view of a coupling member that may be used as an alternative to the lenses described in connection with FIG. 1, for instance.

DETAILED DESCRIPTION OF THE PREFERRED EMBODIMENTS

Figure 1A:
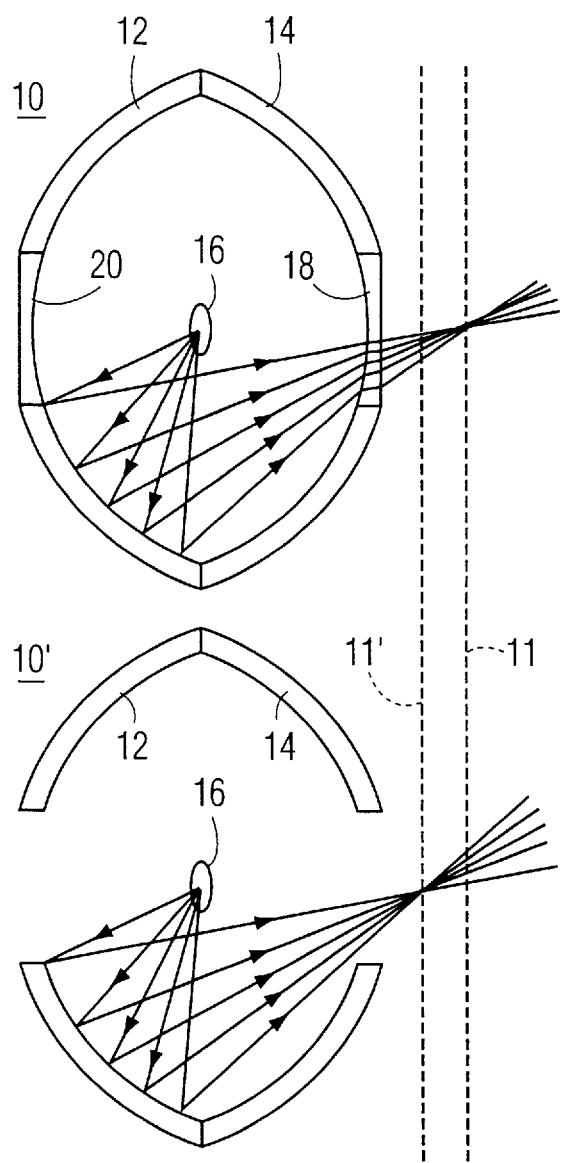
FIG. 1A is a simplified side plan view in section of a pair of light coupling arrangements respectively with and without a negative lens, with superimposed ray tracings to illustrate an important principle of the present invention.

FIG. 1 shows a light coupling arrangement 10 according to a preferred embodiment of the present invention. Because the left and right sides of arrangement 10 as shown in FIG. 1 are typically symmetrical with each other, for brevity the following description focusses more on one side than the other. Arrangement 10 comprises a pair of reflectors 12 and 14 which, collectively, surround a light source 16 and, for this purpose, may be each ellipsoidal in shape. Reflector 12 reflects light from source 16 to a lens 18 positioned in the wall of reflector 14. Similarly, reflector 14 reflects light from source 16 to a lens 20 positioned in the wall of reflector 12. Looking from the right or left in FIG. 1, lenses 18 and 20 would appear circular.

Light source 16, schematically shown as a point, preferably comprises a high brightness, high pressure discharge light source. Light source 16 may comprise the light source described and claimed in U.S. Pat. No. 5,239,230, issued on Aug. 24, 1993 to Mathews et al., assigned to the same assignee as the present invention, and herein incorporated by reference in its entirety. Such light source is capable of providing a light output in the range of greater than 4000 lumens from an arc gap of approximately 2.5. By way of example, light source 16 could alternatively comprise a high brightness halogen light source.

The interior of reflectors 12 and 14 are respectively coated with reflective coatings 12A and 14A, which, however, do not cover lenses 18 and 20. Such reflective coating may comprise an optical interference filter formed from alternating layers of high and low index of refraction material. Such filters can be designed to reflect visible light, but transmit infrared light, for instance. Typical pairs of alternating high and low index of refraction material comprise tantala and silica, niobia and silica, titania and silica, or hafnia and silica. The number of layers typically may be above 15, e.g. 24. Borate masking can be used to pattern reflective coatings 12A and 14A so as not to cover lenses 18 and 20. Further details of the foregoing optical interference coating may be found in co-pending application Ser. No. 08/165,447, filed Dec. 10, 1993, assigned to the instant assignee, and herein incorporated by reference.

Further, the interior surfaces of reflectors 12 and 14 may be faceted, as is known per se in the art, to create a more spatially uniform light distribution.

Reflectors 12 and 14 each have two focal points. Respective first focal points of the reflectors substantially coincide with light source 16. Typically the coincidence is virtually total, but the invention yields substantially the same benefits where the coincidence is not total but is sufficient to achieve a substantial coupling of light from source 16 to lenses 18 and 20. As used herein, such condition of substantial coupling of light occurs when respective focal points of the reflectors "substantially coincide" with each other. A second focal point for reflector 12 is shown as point 19. Inlet surface 18A of lens 18 is positioned between light source 16 and second focal point 19, so as to create a modified, effective second focal point 19'. Similarly, a second focal point for reflector 14 is shown as point 21. Inlet surface 20A of lens 20 is positioned between light source 16 and second focal point 20, so as to create a modified, effective second focal point 21'.

Inlet surfaces 22A and 24A of light distribution harnesses 22 and 24 are preferably positioned at modified, effective focal points 19' and 21' of the reflectors. The harnesses guide light received from source 16 to remote optics (not shown) such as automobile headlamps, or lighting in display cases in stores. As shown, harnesses 22 and 24 may comprise light guides formed, for instance, of a bundle (not shown) of optical light conductors. Further details of light guides are provided in U.S. Pat. No. 5,341,445 issued to J. Davenport and R. Hansler (also present inventors), and assigned to the present assignee. Other types of light distribution harnesses may be used, such as lenses, fold mirrors, lens systems, mixing rods, and prisms. For instance, a mirror could be placed at point 19', in lieu of harness 22, to force light back through light source 16 and into harness 24.

Light guides 22 and 24 are respectively spaced from their associated lenses 18 and 20 by a distance D. Such distance is sufficient to thermally isolate the light guides from lenses 18 and 20, whose temperature increases when light source 16 is powered, and its selection will be apparent to those of ordinary skill in the art. Spacing D also permits insertion of a light modulator 150 (shown in phantom), such as a color filter or light-blocking member, into any of the paths of light shown, so as to modulate the color or the on/off condition of light at the remote optics (not shown).

In accordance with an aspect of the present invention, lenses 18 and 20 comprise negative, or diverging lenses. Negative lenses receive converging light at a first angular distribution and transmit light at a reduced, converging angular distribution. Thus, light received at inlet surfaces 18A and 20A of the lenses an angular distribution of, e.g., 53 degrees, is converted to a reduced angular distribution at outlet surfaces 18B and 20B of the lenses of, e.g., 37 degrees. This enables the use of light guides 22 and 24 with readily available numerical apertures. As used herein, a numerical aperture of 0.5 is obtained where 90 percent of the light is contained within a 60-degree cone angle. Light guides with numerical apertures in the range of 0.4 to 0.65 are readily available.

FIG. 1A illustrates the function of a negative lens in accordance with the invention. In FIG. 1A, light coupling arrangement 10 includes negative lenses 18 and 20; light coupling arrangement 10' does not. As shown, ray tracings from reflector 12 of arrangement 10', which lacks the negative lenses, converge to the right of the arrangement at line 11', at a focal point of the reflector. Ray tracings from reflector 12 of arrangement 10, which includes negative lenses, converge to the right of the arrangement at line 11, at a modified, effective focal point of the reflector. This is due to the action of negative lens 18, which creates the modified, effective focal point of reflector 12. As can be appreciated from the ray tracings in the figure, the angular distribution of the ray tracings that pass through negative lens 18 is beneficially less than the angular distribution of the ray tracings provided by arrangement 10'.

In its broadest meaning herein, a negative lens is intended to include a lens having a negative curvature in at least one direction generally transverse to a main light transmission axis, for receiving light at a first angular distribution and transmitting light at a reduced angular distribution. Such a lens could include a non-negative curvature in another (e.g. orthogonal) direction, and at least one or both of the inlet and outlet surfaces of such lens could be curved to implement the negative lens function.

Typically, inlet surfaces 18A and 20A of lenses 18 and 20 are concave, and axisymmetrical about an axis 26 that is shown in FIG. 1 as extending to the right and left, and as coincident to main light transmission (or optical) axes of lenses 18 and 20. Inlet surfaces 18A and 20A may have, as an alternative to the curves shown, a so-called axicon shape. Such a shape has been found effective to fill in the 0-degree angle light passed to light guide 22. A particular example of an axicon shape is shown in FIG. 2 for a lens 18. As shown, lens 18 comprises a concave, conical surface that is axisymmetrical about axis 26.

Returning to FIG. 1, outlet surfaces 18B and 20B are preferably flat, to allow easy manufacturing by pressing or polishing. However, outlet surfaces 18B and 20B can have other shapes and still function according to the present invention. The upper and lower boundaries of lenses 18 and 20 are shown as dashed lines. This is to indicate that the lenses could be formed integrally with reflectors 14 and 12, respectively, for ease of manufacturing, or they could be comprise separately formed parts. (Such dashed lines as appear in association with the lenses in the further figures all have the foregoing property.)

Where reflectors 12 and 14 are ellipsoidal in shape, a particularly preferred embodiment is obtained where the curvature for lenses 18 and 20 coincides with the curvature of the adjacent reflectors. This condition is shown in FIG. 1, and simplifies the manufacturing of the reflectors; for instance, the patterning of the reflective coatings 12A and 14A tolerates some variation, with a larger opening resulting in larger lenses, and a smaller opening resulting in a larger reflecting area. Such a condition is obtained according to the following equations for a numerical aperture of 0.5 of the distribution of light from the lenses:

$$x^2/a^2 + y^2/b^2 = 1; \quad a^2 = b^2 + c^2; \quad a/c \approx 2.5 \qquad \text{(eqs. 1)}$$

where, for each ellipsoidal shape, the major axis is $2a$; the minor axis, $2b$; x and y are the two orthogonal dimensions; a, b, and c are constants, with $2c$ being the separation between the two foci of an ellipse; and a numerical aperture as defined above. Preferably, the ratio of a/c is between about 2.0 and 3.0 for an elliptical reflector.

Referring to FIG. 3, in contrast with lens 18 of FIG. 1, lens 18 of FIG. 3 is shifted to the right, as shown. Referring to FIG. 4, in contrast with lens 18 of FIG. 1, lens 18 of FIG. 4 is shifted to the left, as shown. As with the embodiment of FIG. 1, lens 18 of FIGS. 3 and 4 can be formed integrally with, or as separate from, reflector 14, as indicated by the dashed-line upper and lower boundary between the lens and reflector.

In contrast to the curvature of inlet surface 18A of lens 18 as shown in FIG. 1, the curvature of lens inlet surface 18A may be different from that of its adjacent reflector. FIG. 5 shows a more accentuated curvature for inlet surface 18A of lens 18. As with the embodiment of FIG. 1, lens 18 can be formed integrally with, or as separate from, reflector 14, as indicated by the dashed-line upper and lower boundary between the lens and reflector.

FIG. 6 shows the use of an elongated coupling member 18' rather than the more compact lens 18 as shown in FIG. 1. Inlet surface 18A' of coupling member 18 is curved in concave fashion in similar manner as the curve of lens inlet surface 18A shown in FIG. 1. Accordingly, coupling member 18' functions as a negative lens as described above, to reduce the angular distribution of light it transmits to light harness 22 compared to the angular distribution of light it receives at inlet surface 18A'. Coupling member 18' may be sufficiently long to provide the necessary thermal isolation from heat from light source 16 such that its outlet surface 18B' terminates in direct proximity to the second focus of reflector 12 (shown in FIG. 1) where inlet surface 22A of the light harness is preferably positioned. Coupling member 18' may be modified in the above-described manners of modifying lens 18 of FIG. 1, for instance, by making inlet surface 18A' have an axicon shape.

Figure 7:
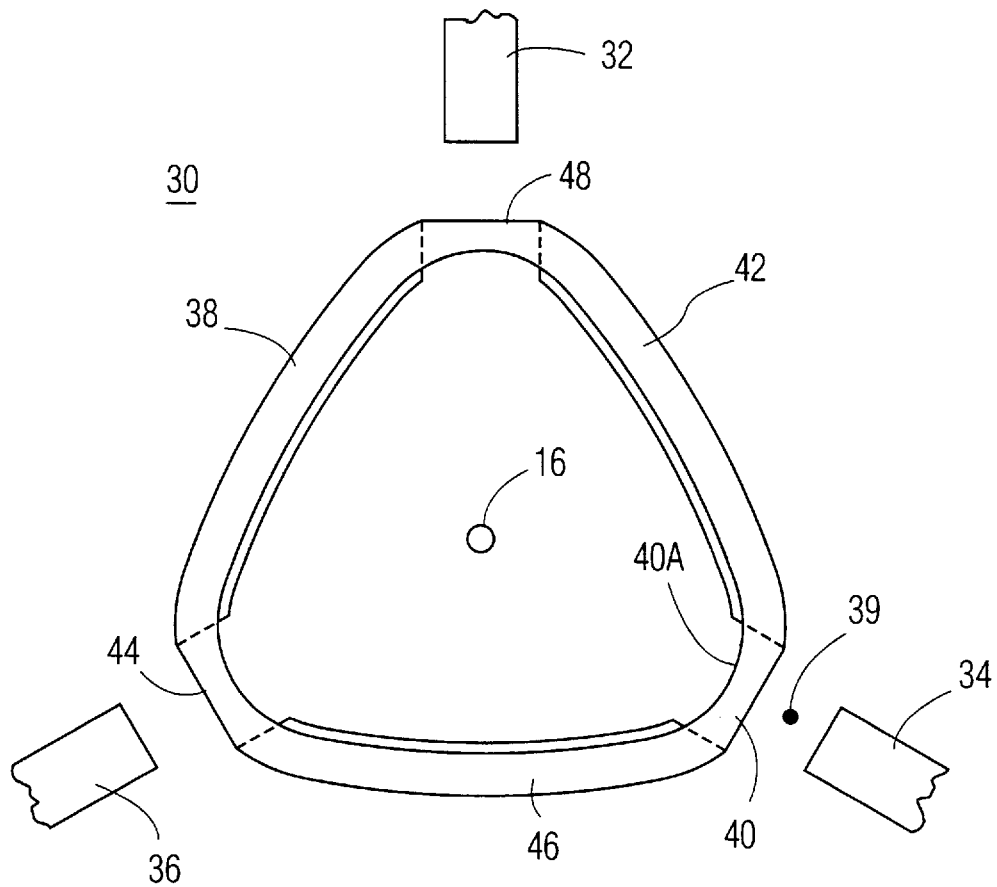
FIG. 7 is a top plan view in section of a light coupling arrangement in accordance with a further embodiment of the invention that employs three negative lenses.

FIG. 7 shows an arrangement 30 for coupling light from light source 16 to three light distribution harnesses 32, 34 and 36. Reflector 38 has a first focal point preferably coincident with light source 16 and a second focal point 39 positioned further away from the light source. An inlet surface 40A of a lens 40 is positioned between light source 16 and second focal point 39. Lens 40 functions in the manner described above for lens 18 or lens 20. Reflector 42 interacts with lens 44 in the same manner as reflector 38 interacts with lens 40 as just described. Similarly, reflector 46 interacts with lens 48 in the same manner as reflector 38 interacts with lens 40 as just described. Reflectors 38, 42 and 46 may be ellipsoidal in shape. The various parts of arrangement 30 function in the same manner as the like-named parts mentioned above.

Figure 8:
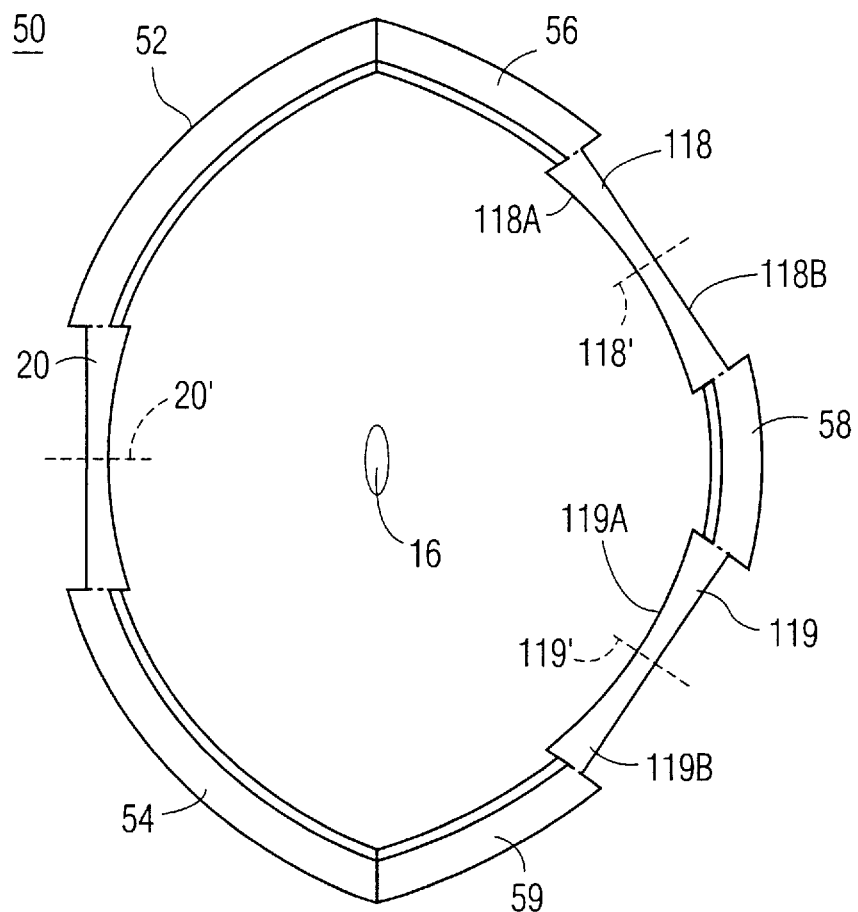
FIG. 8 is a side plan view in section of a light coupling arrangement in accordance with a still further embodiment of the invention that employs non-symmetrically arranged lenses.

FIG. 8 shows an arrangement 50 employing a negative lens 20 between reflector portions 52 and 54, a negative lens 118 between reflector portions 56 and 58, and a negative lens 119 between reflector portions 58 and 59. In this arrangement, the mentioned lenses are arranged non-symmetrically about light source 16. Lenses 118 and 119, for instance, may be used to provide illumination for the right and left headlamps of an automobile, while lens 20 provides illumination for the interior of such automobile. In the illustrated embodiment, lenses 118 and 119 could be, for example, closer to a cylindrical lens than to a standard spherical lens. For example, a biconic lens might be used, which has different curvatures in two different orthogonal directions. More broadly, however, one or more of the inlet 118A, 119A or outlet 118B, 119B surfaces of lenses 118 and 119 could be non-axisymmetrical about respective axes 118' and 119' that are aligned with the main paths of light transmission through the lenses. For instance, lenses 118 and 119 could have different curvatures in two different, non-orthogonal directions. In contrast, lens 20 would typically be axisymmetrical along axis 20' aligned with a main path of light transmission through the lens. As with the prior embodiments, e.g., FIG. 1, light harnesses (not shown) are used to distribute the light they receive from the lenses to remote optics (not shown).

Figure 9:
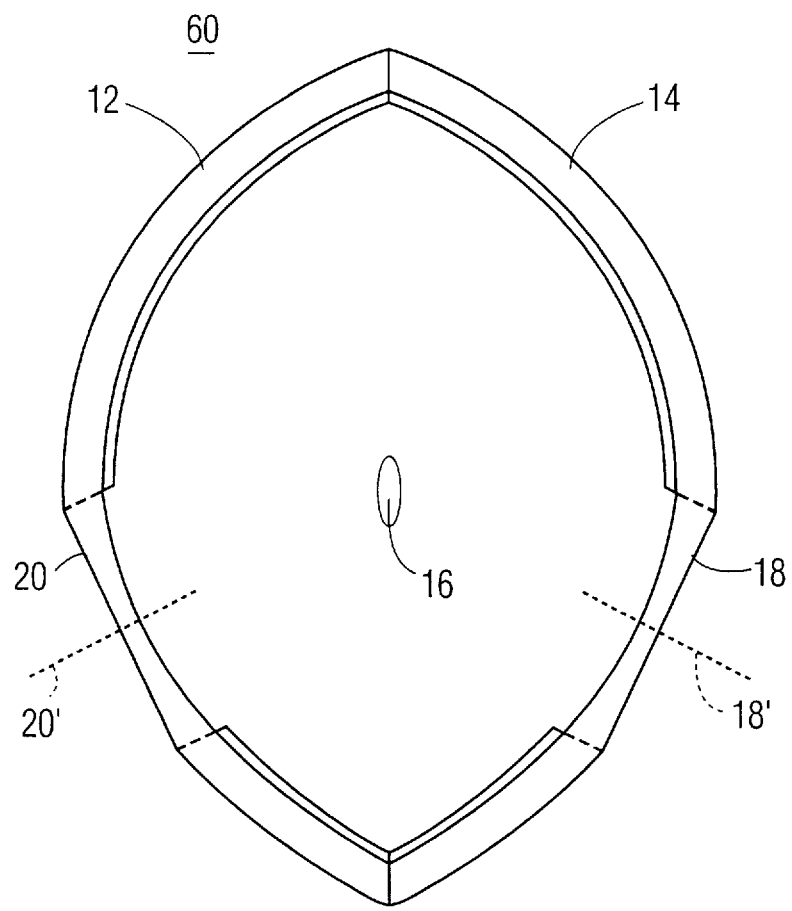
FIG. 9 is a side plan view in section of a light coupling arrangement in accordance with another embodiment of the invention also employing non-symmetrically arranged lenses.
Figure 9A:
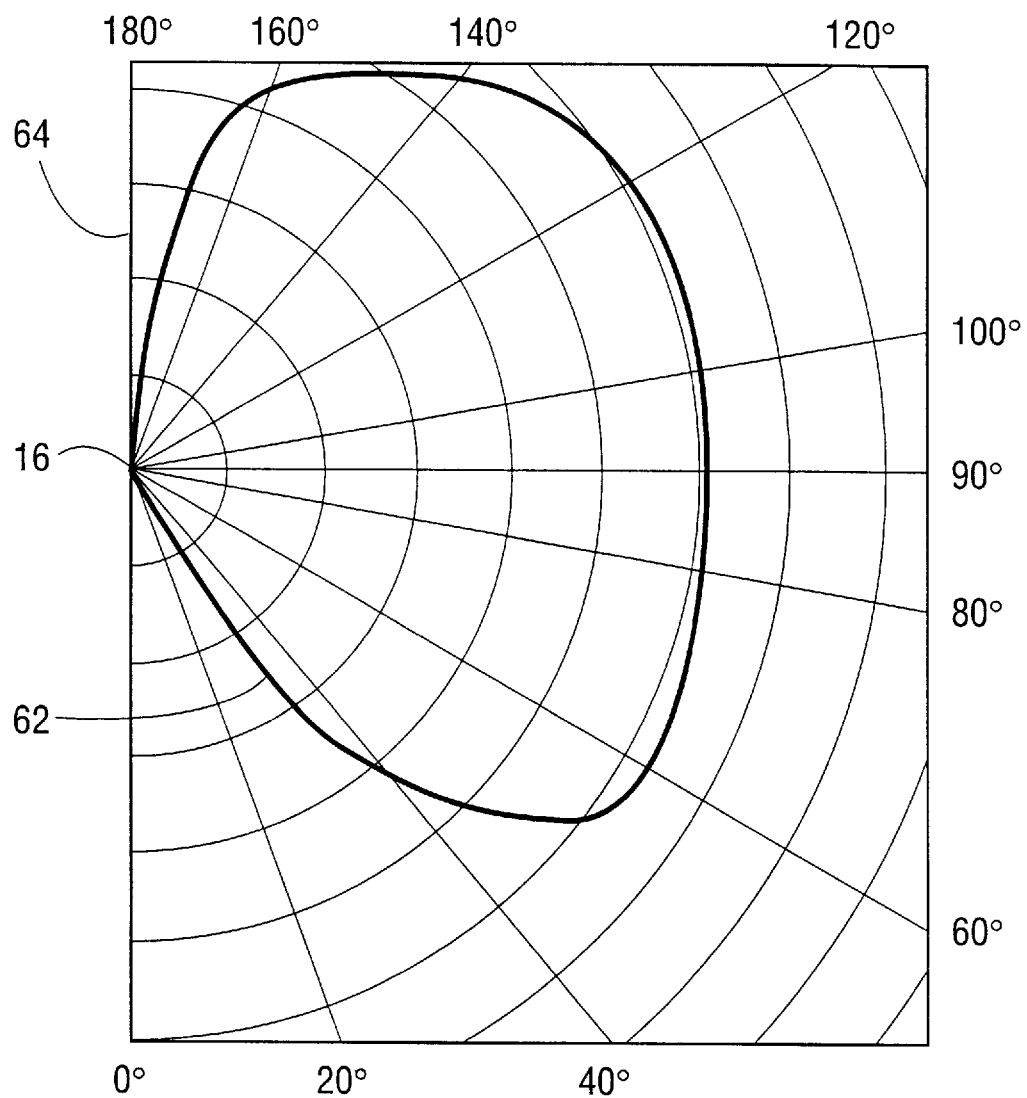
FIG. 9A is a graphical depiction of a portion of a light distribution from a light source used in the embodiment of FIG. 9.

FIG. 9 shows an arrangement 60 including a pair of negative lenses 18 and 20 as in FIG. 1. However, the lenses in the arrangement of FIG. 9 are disposed more downwardly as shown than the corresponding lenses in FIG. 1. This is to accommodate for an asymmetrical distribution of light from light source 16. FIG. 9A shows such an asymmetrical light distribution in a graphical depiction of a section of the right half only of light distribution 62 of light source 16. Light distribution 16 has a generally toroidal shape about an axis 64. However, it has a greater lumen output oriented above the light source, than below it. To most effectively couple light from light source 16, lenses 18 and 20 are correspondingly located below light source 16. Lenses 18 and 20 typically will be axisymmetrical about axes 18' and 20', respectively, aligned with main paths of light transmission through the lenses.

Figure 10:
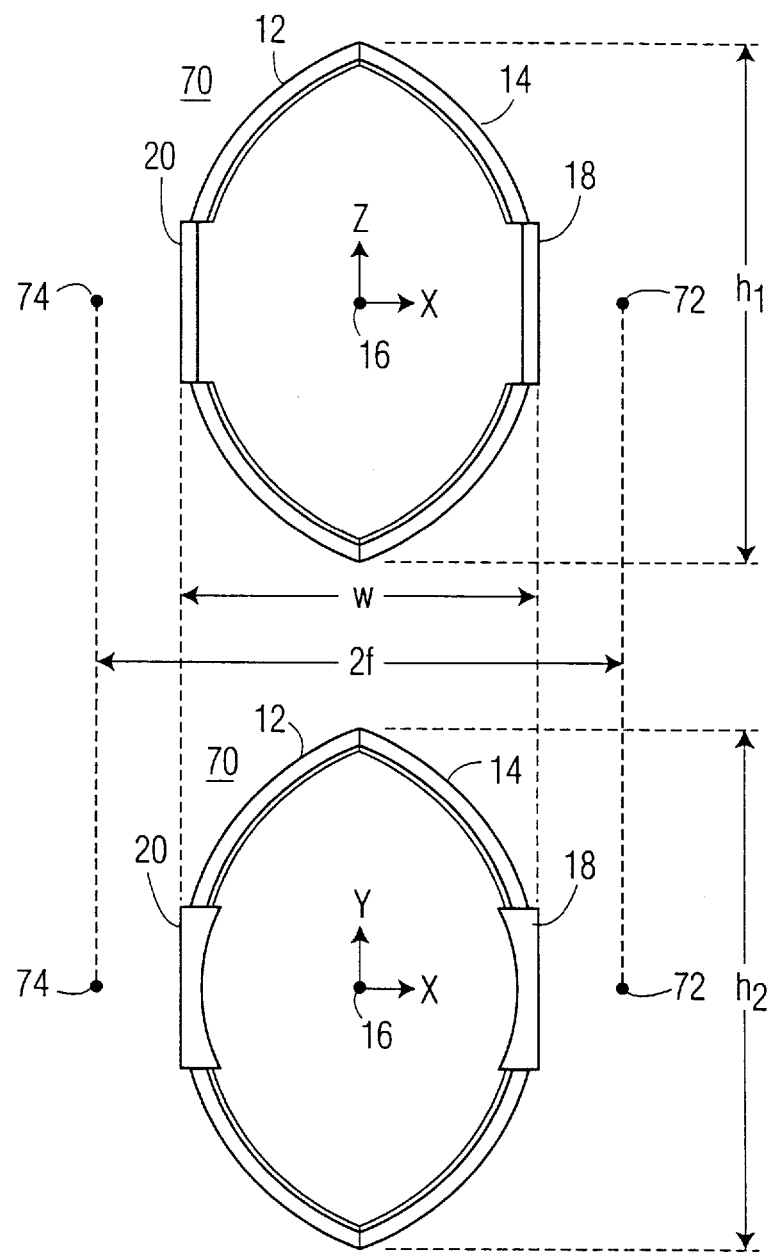
FIG. 10 shows a side plan view (at the top) and a top plan view (at the bottom) of a light coupling arrangement in accordance with a further embodiment of the invention.

FIG. 10 shows a side plan view (top of figure) and a top plan view (bottom of figure) of an arrangement 70. In this arrangement, reflectors 12 and 14 each have a biconic shape with major x, y, and z axes and dimensions $h_1$ and $h_2$ as shown in the drawing. A modified, effective focal point of reflector 12 is shown as point 72, and a modified, effective focal point of reflector 14 is shown at point 74. The explicit quartic form of a biconic surface is:

$$x=(z^2/r+y^2/r_2)/(1+\sqrt{1-ez^2/r-e_2y^2/r_2})) \quad \text{(eq. 2)}$$

Using the following definitions:

$$r=a/b^2;\ r_2=a_2b_2{}^2;\ e=1a;\ \text{and}\ e_2=1/a_2 \quad \text{(eqs. 3)}$$

allows the biconic equation to approximate the typical ellipse equations in the two orthogonal axes:

$$x^2/a^2+z^2/b^2=1;\ x^2a_2{}^2+y^2/b_2{}^2=1 \quad \text{(eqs. 4)}$$

$$a-c=w/2=a_2-c_2;\ h_2 \neq h_1 \quad \text{(eqs. 5)}$$

$$c=\text{square root of } (a^2-b^2) \quad \text{(eq. 6)}$$

$$c_2=\text{square root of } (a_2{}^2-b_2{}^2) \quad \text{(eq. 7)}$$

where w and 2f are constant; variables a, b, and c (not shown) as defined above in connection with eqs. 1, with a, b and c pertaining to the curvature of the reflectors as shown in the upper side of the figure, and with $a_2$, $b_2$, and $c_2$ as shown in the lower side of the figure. For the system illustrated, the light source is conveniently located such that $a-c=a_2-c_2$. Accordingly, the second focus of the reflectors in the two orthogonal planes is different, but the first focus, where the light source is located, is the same.

In the embodiment of FIG. 10 as described, the reflectors have different curvatures in the two orthogonal x-y and x-z planes, but both curves have a common focus coincident or substantially coincident with light source 16 shown as a point. Accordingly, the angular distributions of light in the two orthogonal planes will be different, and will not have second foci that are coincident. This will be advantageous in some designs, such as where the light distribution of light source 16 is toroidal in shape and substantially symmetrical about a central axis of such shape. Such shape contrasts with the light distribution shown in FIG. 9A, for instance, which produces substantially more light above light source 16 than below it.

In the embodiment of FIG. 10 as described above, lenses 18 and 20 may be biconic also, i.e., having different curvatures in two different orthogonal directions. Thus, lenses 18 and 20 appear flat on both of their sides as viewed in the upper side of FIG. 10, but curved in the view of the lower side of the figure. The curvature is needed to form a negative curvature in the one case to obtain a lower angular distribution of light in the associated direction, whereas in the other direction the angular distribution need not be decreased so that no negative curvature is needed in such direction.

Although the reflectors and the lenses of the embodiment of FIG. 10 could be biconic as described, they could alternately have different curvatures in two axes that are non-orthogonal to each other, such as at 80 degrees to each other. The reflectors, however, still would have a common axis coincident or substantially coincident with light source 16.

Figure 10A:
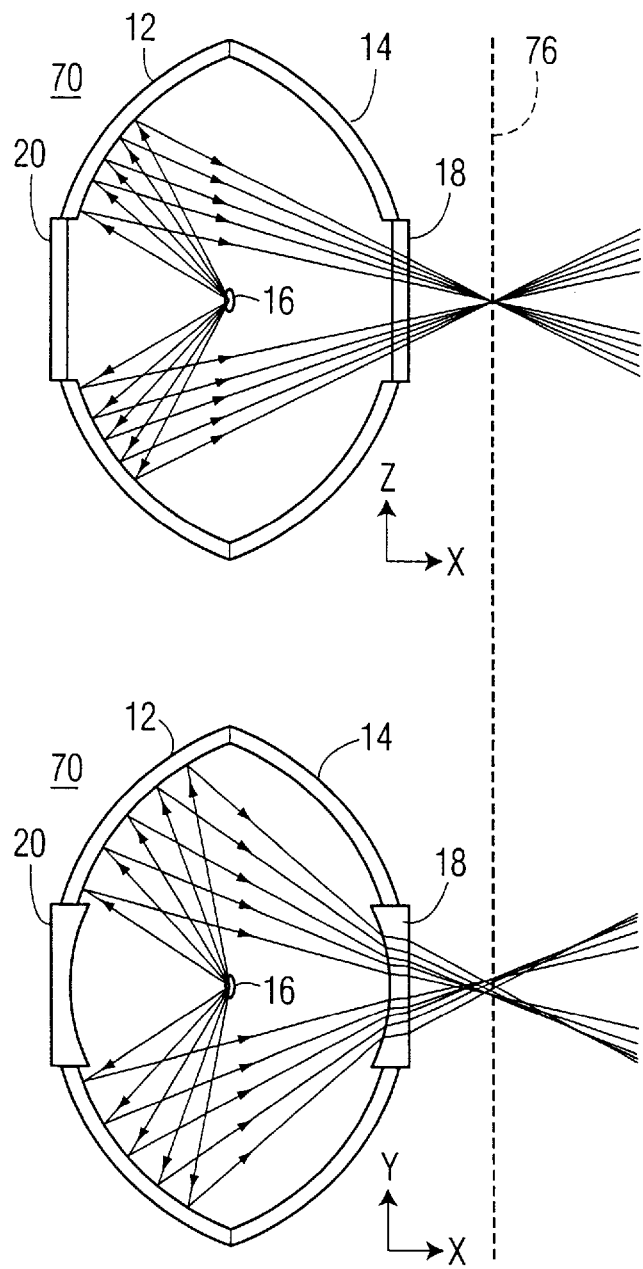
FIG. 10A is a simplified side plan view in section of a side view (at the top) and a top view (at the bottom) of a light coupling arrangement using biconic negative lenses and biconic reflectors, and with superimposed ray tracings to illustrate a principle of the present invention.

FIG. 10A shows in simplified form a side plan view (top of figure) and a top plan view (bottom of figure) of arrangement 70 of FIG. 10. Light from light source 16 is uniform in the x-y plane, but there is very little light along the z axis. Such a condition occurs with the toroidal distribution mentioned above in connection with FIG. 10. In the side plan view (top of figure), the lens radius is ∞, the ratio a/c is 2.4, and the quantity a–c is 19.5, a and c being defined above in connection with eqs. 1. In the top plan view (bottom of figure), the lens radius is –22 mm, the ratio a/c is 2.55 and the quantity a–c is 19.5.

By using a biconic lens 18 with a curvature in the plane of the upper plan view (bottom of figure) of FIG. 10A, the second focal point of reflector 12 is adjusted to be positioned along line 76, rather than closer to the reflector. The negatively curved lens 18 in the plane of the lower view is desirable also to reduce the angular distribution of light transmitted from the lens. On the other hand, as the ray tracing shows for plan view (top of figure) of FIG. 10A, the angle of light transmitted through lens 18 is naturally low, since there is very little light produced along the z axis. With biconic lens 18 having no curvature in the plane of the upper view of FIG. 10A, the second focal point of reflector 12 coincides with line 76. This enables efficient coupling of light to a light distribution harness (not shown) placed to receive light at line 76.

Figure 10B:
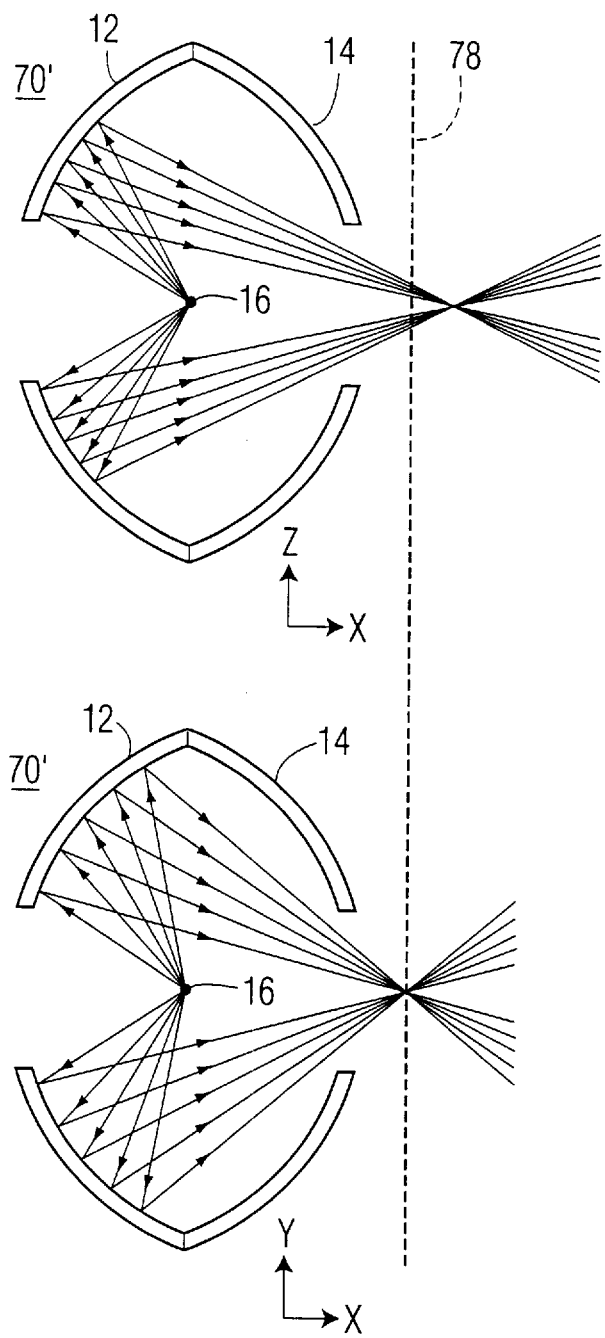
FIG. 10B is similar to FIG. 10A, but shows the light coupling arrangement without lenses, and with superimposed ray tracings to illustrate deficient operation.

FIG. 10B is similar to FIG. 10A, with the mentioned conditions applying, but the arrangement 70' shown lacks lenses. As can be appreciated, a mismatch occurs in the location of the second focal points for the side plan (top of figure) and top plan (bottom of figure) view, respectively. Line 78 passes through the second focal point for lens 12 in the top plan view (bottom of figure), but the second focal point for lens 12 in the side plan view (top of figure) is located to the right of the line. The angular distribution of light in the top plan view (bottom of figure) is also high. The use of the biconic lens in connection with FIG. 10A resolves both of the foregoing problems, resulting in more efficient light coupling into light distribution harnesses.

Figure 11:
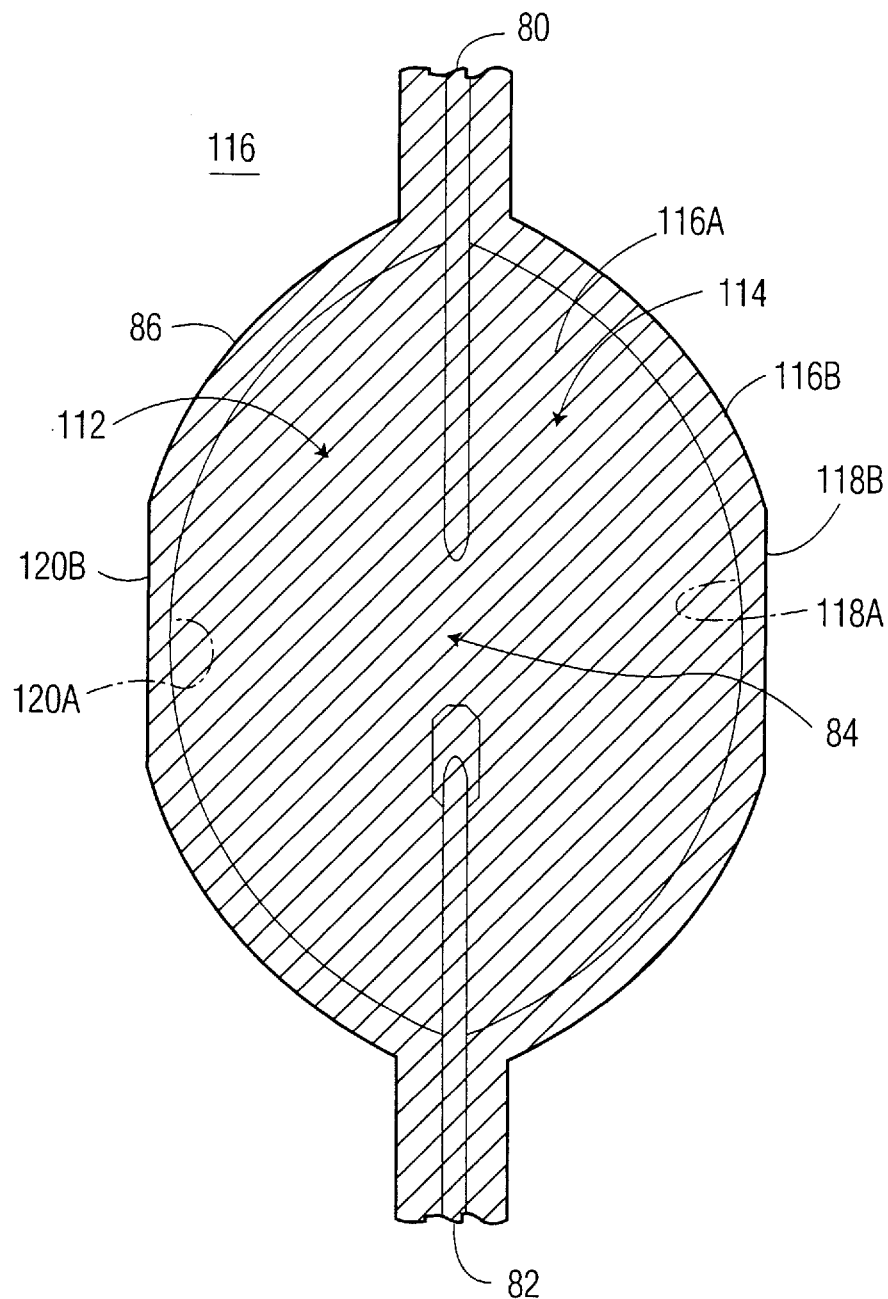
FIG. 11 is a side plan view in section of a light coupling arrangement in accordance with yet another embodiment of the invention in which a reflective coating is disposed on a vitreous envelope of a light source.

FIG. 11 shows a high intensity light source 116 having electrodes 80 and 82 that are spaced by a gap 84 at which light is generated due to an arc discharge in a gaseous medium (not shown) contained within a sealed chamber 116A of a vitreous envelope 116B. Envelope 116B is coated with an interference coating 86, shown by cross-hatching, except at surfaces 118B and 120B, where light is allowed to exit from the light source. Coating 86 is interiorly reflecting to visible light, and preferably transmissive to infrared light. Coating 86 may be considered to comprise a portion, or member, 112, shown to the left of electrodes 80 and 82, and a portion, or member, 114, formed to the right of the electrodes. As shown, exterior surfaces 118B and 120B are flat, in which case the interior surfaces 118A and 120A adjacent exterior surfaces 118B and 120B, respectively, are curved to create negative lenses between adjacent surfaces 118B, 118A and 120B, 120A Exterior surfaces 118B and 120B, however, could be curved to implement negative lenses between the foregoing, adjacent surfaces. Preferably, interior surfaces 118A and 120A have a curvature that coincides with (i.e., matches), the curvatures of the reflector portions 114 and 112, respectively.

The similarity in the reference numerals as between the embodiment of FIG. 11 and the prior embodiments is intended to signify that the above-described principles of the invention apply also to the embodiment of FIG. 11. Moreover, the embodiment of FIG. 11 is not limited to an electroded light source, as shown, but also applies to electrodeless light sources.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A compact coupling arrangement between a light source and a plurality of light distribution harnesses, said arrangement comprising:

(a) a plurality of reflector members arranged around said light source with respective focal points of said reflector members positioned substantially coincident with said light source so as to receive light from said source and reflect said light away from said source;

(b) a plurality of light coupling members, each having an inlet and an outlet surface for receiving light originating from said light source and transmitting light, respectively; and (c) a plurality of light distribution harnesses for respectively receiving light from said light coupling members;

(d) said light coupling members each comprising a lens having a negative curvature in at least one direction generally transverse to an optical axis therethrough, for receiving light at a first angular distribution and transmitting light at a reduced angular distribution; and (e) at least one reflector member being ellipsoidal in shape so as to have a major axis and a pair of foci, with the ratio of said major axis to the separation between said foci being between about 2.0 and 3.0.

2. The arrangement of claim 1, wherein:

(a) at least one of said light coupling members is spaced from its associated light distribution harness; and (b) a light modulator is interposed between said at least one of said light coupling members and its associated light distribution harness.

3. The arrangement of claim 1, wherein:

(a) at least one of said light coupling members comprising an integral portion of one of said reflector members; and (b) said inlet surface of at least one of said light coupling members is positioned closer to said light source than to the adjacent, reflecting portion of the reflector member of which it is an integral portion.

4. The arrangement of claim 1, wherein:

(a) at least one of said light coupling members comprising an integral portion of one of said reflector members; and (b) said inlet surface of at least one of said light coupling members is positioned farther away from said light source than from the adjacent, reflecting portion of the reflector member of which it is an integral portion.

5. The arrangement of claim 1, wherein said light source comprises a high brightness, high pressure discharge light source.

6. The arrangement of claim 1, wherein at least one of the inlet and outlet surfaces of one of said coupling members is axisymmetrical about the optical axis of its associated coupling member.

7. A compact coupling arrangement between a light source and a plurality of light distribution harnesses, said arrangement comprising:

(a) a plurality of reflector members arranged around said light source with respective focal points of said reflector members positioned substantially coincident with said light source so as to receive light from said source and reflect said light away from said source;

(b) a plurality of light coupling members, each having an inlet and an outlet surface for receiving light originating from said light source and transmitting light respectively; and (c) a plurality of light distribution harnesses for respectively receiving light from said light coupling members;

(d) said light coupling members each comprising a lens having a negative curvature in at least one direction generally transverse to an optical axis therethrough, for receiving light at a first angular distribution and transmitting light at a reduced angular distribution;

(e) at least one of the inlet and outlet surfaces of one of said coupling members having an axicon shape in at least one direction substantially orthogonal to its main light transmission axis.

8. The arrangement of claim 1, wherein said plurality of reflectors, said plurality of light coupling members, and said plurality of light distribution harnesses each comprise three.

9. The arrangement of claim 1, wherein:

(a) said light source produces a light distribution having a generally toroidal shape about a central axis, and having a greater lumen output on one axial side than on the other side; and (b) said light coupling members are correspondingly positioned more to said one anal side than to the other side.

10. The arrangement of claim 1, wherein said coupling members are arranged non-symmetrically around said light source.

11. The arrangement of claim 10, wherein at least one of said coupling members is non-axisymmetrical about an axis that is aligned with a main path of light transmission through said coupling member.

12. The arrangement of claim 10, wherein said plurality of coupling members is greater than two.

13. The arrangement of claim 1, wherein said reflector members comprise a reflective coating formed on a vitreous envelope of said light source.

14. A compact coupling arrangement between a light source and a plurality of light distribution harnesses, said arrangement comprising:

(a) a plurality of reflector members arranged around said light source with respective focal points of said reflector members positioned substantially coincident with said light source so as to receive light from said source and reflect said light away from said source;

(b) a plurality of light coupling members, each having an inlet and an outlet surface for receiving light originating from said light source and transmitting light, respectively; and (c) a plurality of light distribution harnesses for respectively receiving light from said light coupling members;

(d) said light coupling members each comprising a lens having a negative curvature in at least one direction generally transverse to an optical axis therethrough for receiving light at a first angular distribution and transmitting light at a reduced angular distribution;

(e) at least one of said light coupling members comprising an integral portion of one of said reflector members whose curvature substantially coincides with curvature of an adjacent reflector member; and (f) at least one reflector member being ellipsoidal in shape so as to have a major axis and a pair of foci, with the ratio of said major axis to the separation between said foci being between about 2.0 and 3.0.

15. The arrangement of claim 14, wherein said outlet surface of said at least one of said light coupling members comprises a flat surface.

16. The arrangement of claim 14, wherein said light source comprises a high brightness, high pressure discharge light source.

* * * * *